J. J. EVERS.
FLY TRAP.
APPLICATION FILED MAY 23, 1918.

1,286,567.

Patented Dec. 3, 1918.

Inventor
John J. Evers,

By
Attorney

UNITED STATES PATENT OFFICE.

JOHN J. EVERS, OF FAIR OAKS, INDIANA.

FLY-TRAP.

1,286,567. Specification of Letters Patent. Patented Dec. 3, 1918.

Application filed May 23, 1918. Serial No. 236,175.

*To all whom it may concern:*

Be it known that I, JOHN J. EVERS, a citizen of the United States of America, residing at Fair Oaks, in the county of Jasper and State of Indiana, have invented new and useful Improvements in Fly-Traps, of which the following is a specification.

The present invention comprehends generally improvements in that class of inventions known as fishing and trapping, and more particularly relates to a fly trap.

It is the primary aim and object of the present invention to provide a device of the above mentioned character designed to be detachably connected to the outer surface and adjacent the upper cross bar of a screen-door frame for receiving and trapping flies that usually congregate on the door.

It is an equally important object of this invention to provide a device of the above mentioned character wherein the supporting frame thereof is of a novel form, the bottom being designed to support the inlet while the upper part of the frame is removably closed by a cover which permits of access to the interior of the trap when desired.

It is a more specific object of this invention to provide a device of the above mentioned character wherein improved means is employed for bracing the lower portion of the frame and for preventing flies from passing between the rear surface of the trap and the outer surface of the screen-door; and to also provide improved means for attaching the trap in position.

Among the other aims and objects of this invention may be recited the provision of a device of the character described with a view to compactness, and in which the number of parts are few, the construction simple and the cost of production low and the efficiency high.

Other improvements and novel details in the construction and arrangement of the various parts of the apparatus will be brought out more in detail in the description to follow, which for a clear understanding of the invention should be considered in connection with the accompanying drawings forming a part hereof, and wherein is disclosed for the purpose of illustration a convenient and satisfactory embodiment of the invention. It is to be noted in this connection that minor changes in the construction and arrangement of parts may be made without departing from the principle of operation of the various parts.

The invention is clearly illustrated in the accompanying drawings, in which:—

Similar characters of reference are employed in all of the above described views, to indicate corresponding parts.

Figure 1:
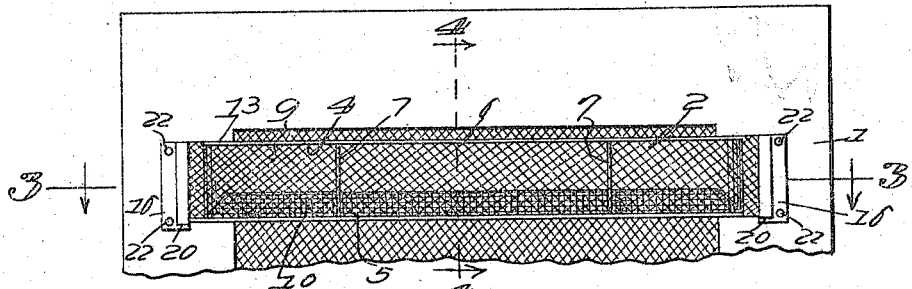
Figure 1 is a front elevation of the invention.
Figure 2:
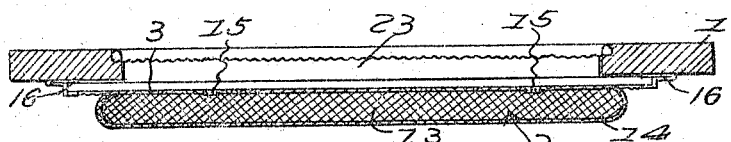
Fig. 2 is a top plan view thereof.
Figure 3:
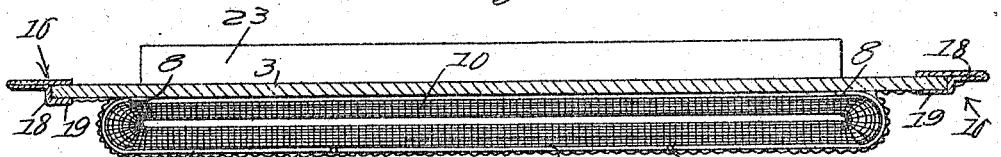
Fig. 3 is a horizontal sectional view of the device taken on line 3—3 of Fig. 1.
Figures 4, 5:
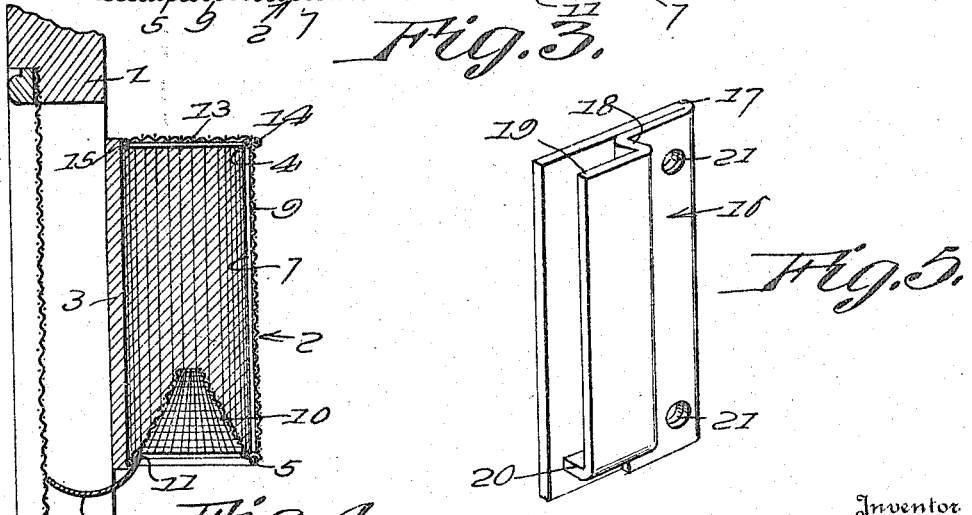
Fig. 4 is a transverse section taken on line 4—4 of Fig. 1.
Fig. 5 is a detail view.

Referring now, more particularly, to the accompanying drawings there is illustrated a portion of a screen-door 1 to the outer surface and upper portion of the frame of which is detachably connected the improved trap, indicated in its entirety by the numeral 2.

In the present instance the improved trap consists of a substantially rectangular frame comprising a rear solid wall 3 from the upper and lower edges of which project at points near the respective ends, upper and lower supporting members 4 and 5 respectively. These members are of substantially U-shape form, the intermediate portions 6 thereof being connected to each other by vertical braces 7 to provide the supporting means for the outer or front wall of the trap while the side arms 8 form the supporting means for the end walls of the trap. Suitable reticulated means, such as a piece of screen 9 is employed and has its respective ends connected to the projecting ends of the plate 3 which serve as extensions, subsequent to being arranged about and secured to the outer surfaces of the members 4 and 5 as indicated in the drawings. Connected in the bottom of the frame is an inlet 10 which is substantially triangular in cross section being formed desirably of screening. The lower portion of the inlet is reinforced by a rectangular frame 11 which is connected to the lower member 5 of the frame and conforms substantially to the contour thereof, while the upper end or vertex is cut away leaving an elongated and relatively narrow slot 12 which permits the flies to crawl up the lower surfaces of the sides and enter the trap. This construction is of such a nature that after the flies enter the trap they will be prevented from passing out of the trap, as is apparent.

In order to permit access to the body of the trap, a reticulated door 13 is employed, the rectangular metallic frame 14 thereof being desirably of a channel shaped form in cross section so as to telescope about the upper edge of the frame or body of the trap when in a closed position. This door is preferably secured to the upper edge of the rear wall 3 by means of hinges 15.

For the purpose of detachably connecting the frame of the trap to the upper cross bar and side bars of the door frame, suitable attaching members each indicated in its entirety by the numeral 16 are employed. Each member 16 is preferably formed from a single piece of metal folded upon itself as at 17, while the outer portion of one of the side portions is offset as at 18 to form a flange 19. The lower edge of each member is bent inwardly to provide a supporting ledge 20. The inner portions of each member intimately contact with each other and are provided with alining openings 21 through which pass suitable fasteners 22 which are in turn anchored in the outer surfaces of the sides of the frame of the door 1 so as to position the attaching members in opposed relation with each other and suitably spaced so that the extensions of the rear wall 3 may be arranged between the flanges 19 and the opposed side portion of each member, as indicated, and supported by the ledges 20. By this construction and arrangement it is apparent that before the opening of the door 1, the device may be moved upwardly from engagement with the flanges and replaced between the flanges subsequent to the cleaning of the trap.

In order to brace the lower portion of the frame and at the same time guide flies into the inlet to prevent them from working between the rear wall 3 and the outer surface of the screen-door, a guard or guide 23 extends from the lower edge of the frame 11 of the inlet member, but terminates short of the respective ends thereof so as to lie between the side bars of the frame of the door 1 and contact with the outer surface of the screen therebetween, as is apparent.

It is believed in view of the foregoing description that a further detailed description of the operation of the invention is entirely unnecessary. Likewise it is believed that the advantages of the invention will be readily apparent.

What is claimed is:—

1. A fly trap of the character described comprising a frame composed of a solid rear wall, upper and lower members projecting outwardly therefrom near the respective ends thereof and braced with respect to each other so as to form a supporting means for the sides and ends of the frame, a piece of reticulated material secured to the projecting ends of the wall, an inlet member for closing the bottom of the trap and designed to allow flies to enter the frame and prevent them from passing out of the frame, a cover for removably closing the top of the frame, and attaching members designed to removably receive and support the projecting ends of the rear wall.

2. A device of the character described comprising a frame composed of a solid rear wall, and reticulated front and end walls, the upper and lower ends of the frame being open, the respective ends of the rear wall constituting extensions, a reticulated inlet member positioned within the bottom of the frame, a reinforcing frame for the inlet member connected to the lower edge of the frame, the upper edge of the inlet member being cut away to form an elongated and relatively narrow inlet slot which permits of the entrance of flies but prevents the escape of flies from the trap, a guard projecting from the inner edge of the reinforcing frame, a cover for removably closing the open top of the frame, and attaching elements for removably receiving and supporting the extensions.

In testimony whereof I affix my signature.

JOHN J. EVERS.

Copies of this patent may be obtained for five cents each, by addressing the "Commissioner of Patents, Washington, D. C."